United States Patent
Wang et al.

(10) Patent No.: US 8,566,622 B2
(45) Date of Patent: Oct. 22, 2013

(54) COMPUTER WAKE UP CIRCUIT

(75) Inventors: Hai-Li Wang, Shenzhen (CN);
Xian-Kui Chen, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 288 days.

(21) Appl. No.: 13/155,419

(22) Filed: Jun. 8, 2011

(65) Prior Publication Data
US 2012/0297208 A1    Nov. 22, 2012

(30) Foreign Application Priority Data

May 17, 2011    (CN) .......................... 2011 1 0127058

(51) Int. Cl.
*G06F 1/32*    (2006.01)
(52) U.S. Cl.
USPC ........................................... 713/300; 713/320
(58) Field of Classification Search
None
See application file for complete search history.

(56) References Cited

U.S. PATENT DOCUMENTS

2006/0046777 A1*   3/2006   Oh ............................. 455/556.2
2009/0153189 A1*   6/2009   Kirk et al. ........................ 326/46

OTHER PUBLICATIONS

Atmel, "8-bit Microcontroller with 2K Bytes Flash: AT89C2051", 2008 Atmel Corporation, pp. 1-2.*

* cited by examiner

*Primary Examiner* — Paul Yanchus, III
(74) *Attorney, Agent, or Firm* — Altis & Wispro Law Group, Inc.

(57) ABSTRACT

A computer wake up circuit, for awaking a computer which is in a sleep state via a computer serial port, includes an AT89 series microcontroller, a switching circuit, an input circuit. The switching circuit is coupled to the pins P3.2 (INT0) and P3.7 of the AT89 series microcontroller, for triggering the AT89 series microcontroller to output an control signal. The input circuit comprises a first resistance, a control switch, a second resistance, and a third resistance. One end of the first resistance is coupled to pin P3.1 (TXD) of the AT89 series microcontroller, the other end of the first resistance is coupled to an input end of the control switch. An output end of the control switch is coupled to the second pin of the computer serial port via the second resistance, and is coupled to the third pin of the computer serial port via the third resistance.

5 Claims, 1 Drawing Sheet

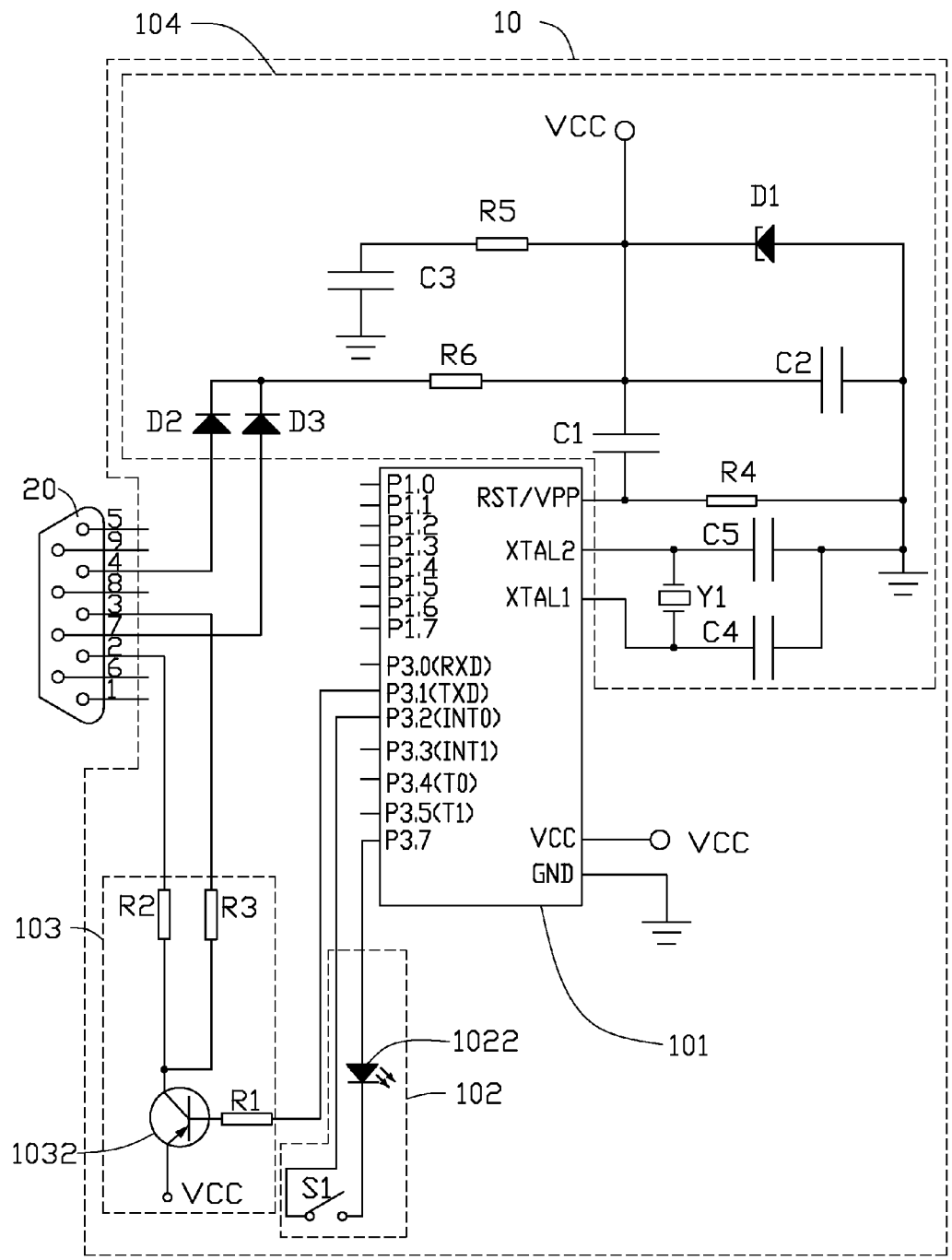

COMPUTER WAKE UP CIRCUIT

BACKGROUND

1. Technical Field

The present disclosure relates to a computer wake up circuit, and particularly to a computer wake up circuit used for waking up a computer from a sleep state.

2. Description of Related Art

With the rapid development of personal computers, development of high performance components of a computer have brought about a corresponding increase in power use. Therefore, wasting of energy becomes more likely if the computer is not changed to a power saving state when not in use. Typically, a wake up circuit is included when designing computer power management for solving the above problem. There is usually a sleep/awake button on a keyboard of a computer that is connected to the inner wake up circuit of a motherboard of the computer. The button is pressed by a user for putting the computer to sleep. Then when the user wishes, presses the same button again to wake up the computer.

The typical wake up circuit receives control signals from the sleep/awake button or peripheral devices to wake the computer from a sleep state. However, the typical wake up circuit is found to be cost-intensive because of their constructional complexity.

What is needed, therefore, is a wake up circuit with reduced cost.

BRIEF DESCRIPTION OF THE DRAWINGS

Many aspects of the embodiments can be better understood with references to the following drawing. The components in the drawing are not necessarily drawn to scale, the emphasis instead being placed upon clearly illustrating the principles of the embodiments. Moreover, in the drawing, like reference numerals designate corresponding parts throughout the several views.

The drawing is a circuit diagram of the computer wake up circuit in accordance with an exemplary embodiment of the present disclosure.

DETAILED DESCRIPTION

Referring to the drawing, a wake up circuit 10 for awaking a computer which is in a sleep state via the computer serial port 20, includes a microcontroller 101, switching circuit 102, an input circuit 103, and a protection circuit 104. The microcontroller 101 is one of the AT89 series. In this embodiment, AT89C2051 mono-chip is adopted as an example of the microcontroller 101.

The switching circuit 102 is coupled to the pins P3.2 (INT0) and P3.7 of the AT89C2051 microcontroller 101, for triggering the AT89C2051 microcontroller 101 to output a control signal. The switching circuit 102 includes a switch S1 and a light source 1022. The switch S1 and the light source 1022 are electrically connected in series between the pins P3.2 (INT0) and P3.7 of the AT89C2051 microcontroller 101. In present embodiment, the light source 1022 is a light-emitting diode (LED).

The input circuit 103 includes a first resistance R1, a control switch 1032, a second resistance R2, and a third resistance R3. One end of the first resistance R1 is coupled to the pin P3.1(TXD) of the AT89C2051 microcontroller 101, the other end of the first resistance R1 is coupled to an input end of the control switch 1032. In present embodiment, the control switch 1032 is a PNP bipolar type transistor. The transistor base, as an input end of the control switch 1032, is coupled to the first resistance R1. The transistor collector, as an output end of the control switch 1032, is coupled to the second pin of the computer serial port 20 via the second resistance R2, and is coupled to the third pin of the computer serial port 20 via the third resistance R3. The transistor emitter, as a power supply end of the control switch, is coupled to a supporting power supply Vcc. In present embodiment, the supporting power supply Vcc supplies 5 volts.

The protection circuit 104 includes a fourth resistance R4, a fifth resistance R5, a sixth resistance R6, a first capacitor C1, a second capacitor C2, a third capacitor C3, a fourth capacitor C4, a fifth capacitor C5, a first diode D1, a second diode D2, a third diode D3, and a crystal oscillator Y1.

One end of the fourth resistance R4 and one end of the first capacitor C1 are both electrically coupled to the pin RST/VPP of the AT89C2051 microcontroller 101, the other end of the fourth resistance R4 is grounded, and the other end of the first capacitor C1 is coupled to the supporting power supply Vcc.

The second capacitor C2 is coupled in parallel with the first capacitor C1 and fourth resistance R4, one end of the second capacitor C2 is grounded, and the other end of the second capacitor C2 is coupled to the supporting power supply Vcc.

The first diode D1 is coupled in parallel with the first capacitor C1 and fourth resistance R4, anode of the first diode D1 is grounded, and cathode of the first diode D1 is coupled to the supporting power supply Vcc. In present embodiment, the first diode D1 is a tunnel diode which is capable of very fast operation, well into the microwave frequency region, by using quantum mechanical effects.

The series connected third capacitor C3 and fifth resistance R5 are cooperatively coupled in parallel with the first capacitor C1 and fourth resistance R4, one end of the third capacitor C3 is grounded, and one end of the fifth resistance R5 is coupled to the supporting power supply Vcc. The second diode D2 is coupled to the fourth pin of the computer serial port 20. The third diode D3 is coupled to the seventh pin of the computer serial port 20. A cathode of the second diode D2 and a cathode of the third diode D3 are both coupled to the supporting power supply Vcc via the sixth resistance R6. The fourth capacitor C4 is electrically coupled to the pin XTAL1 of the AT89C2051 microcontroller 101. The fifth capacitor C5 is electrically coupled to the pin XTAL2 of the AT89C2051 microcontroller 101. The crystal oscillator Y1 is coupled in parallel with the fourth capacitor C4 and the fifth capacitor C5, for providing clocked signal to the AT89C2051 microcontroller 101.

The protection circuit 104 is configured to filter the input signal of the AT89C2051 microcontroller 101 and prevent damaging the computer wake up circuit 10 by abnormal voltage from the computer serial port 20.

In use, when the computer (not shown) is in a sleep state, the switch S1 of the switching circuit 102 turns on, the light source 1022 is lighting and the pin P3.1(TXD) of the AT89C2051 microcontroller 101 outputs a high level to the input end of the control switch 1032. The control switch 1032 turns on and output a high level wake up signal to the second pin and the third pin of the computer serial port 20 respectively. The computer (not shown) is woken up from the sleep state. Due to employing these components, such as the AT89 series microcontroller, the common resistances and capacitors, the computer wake up circuit 10 is duly simplified and therefore cost of the computer wake up circuit 10 is reduced.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer wake up circuit, for awaking a computer which is in a sleep state via a computer serial port, comprising:

an AT89 series microcontroller comprising pins P3.2 (INT0), P3.7, P3.1 (TXD);

a switching circuit coupled to the pins P3.2 (INT0) and P3.7 of the microcontroller, for triggering the microcontroller to output a control signal;

an input circuit comprising a first resistance, a control switch, a second resistance, and a third resistance, one end of the first resistance being coupled to the pin P3.1 (TXD) of the microcontroller, the other end of the first resistance being coupled to an input end of the control switch, an output end of the control switch being coupled to the second pin of the computer serial port via the second resistance and being coupled to the third pin of the computer serial port via the third resistance, and a protection circuit, the protection circuit comprising a fourth resistance, a fifth resistance, a sixth resistance, a first capacitor, a second capacitor, a third capacitor, a fourth capacitor, a fifth capacitor, a first diode, a second diode, a third diode, and a crystal oscillator; one end of the fourth resistance and one end of the first capacitor are both electrically coupled to pin RST/VPP of the microcontroller, the other end of the fourth resistance is grounded, and the other end of the first capacitor is coupled to a supporting power supply; the second capacitor is coupled in parallel with the first capacitor and the fourth resistance, one end of the second capacitor is grounded, and the other end of the second capacitor is coupled to the supporting power supply; the first diode is coupled in parallel with the first capacitor and fourth resistance, anode of the first diode is grounded, and cathode of the first diode is coupled to the supporting power supply; the third capacitor and fifth resistance are cooperatively coupled in parallel with the first capacitor and fourth resistance, one end of the third capacitor is grounded, and one end of the fifth resistance is coupled to the supporting power supply; the second diode is coupled to the fourth pin of the computer serial port, the third diode is coupled to the seventh pin of the computer serial port, a cathode of the second diode and a cathode of the third diode are both coupled to the supporting power supply via the sixth resistance, the fourth capacitor is electrically coupled to pin XTAL1 of the AT89 series microcontroller, the fifth capacitor is electrically coupled to pin XTAL2 of the AT89 series microcontroller; the crystal oscillator is coupled in parallel with the fourth capacitor and the fifth capacitor, for providing clocked signal to the AT89 series microcontroller.

2. The computer wake up circuit of claim 1, wherein the switching circuit comprises a switch and a light source, the switch and the light source are electrically connected in series between the pins P3.2 (INT0) and P3.7 of the microcontroller.

3. The computer wake up circuit of claim 2, wherein the light source is a light-emitting diode.

4. The computer wake up circuit of claim 1, wherein the control switch is a PNP bipolar type transistor, the transistor base as the input end of the control switch is coupled to the first resistance, the transistor collector as output end of the control switch is coupled to the second pin of the computer serial port via the second resistance and is coupled to the third pin of the computer serial port via the third resistance, the transistor emitter is coupled to a supporting power supply.

5. The computer wake up circuit of claim 4, wherein the supporting power supply supplies 5 volts.

* * * * *